3,232,683
GUIDE BEARINGS FOR VERTICAL SHAFTS
Kagehiko Yamamoto and Kinpei Okano, Hitachi-shi, Japan, assignors to Hitachi, Ltd., Tokyo, Japan, a corporation of Japan
Filed May 21, 1963, Ser. No. 281,966
Claims priority, application Japan, May 24, 1962, 37/26,521
2 Claims. (Cl. 308—134.1)

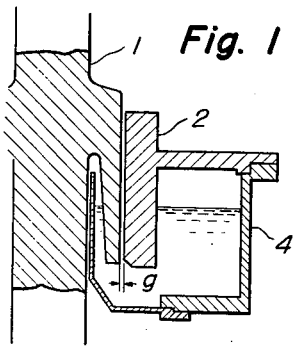
Fig. 1
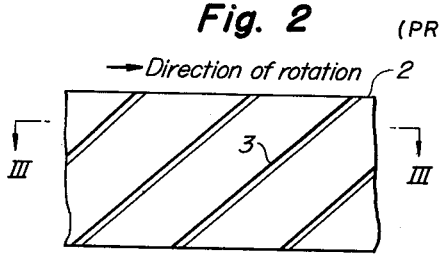
Fig. 2 (PRIOR ART)
Fig. 3 (PRIOR ART)
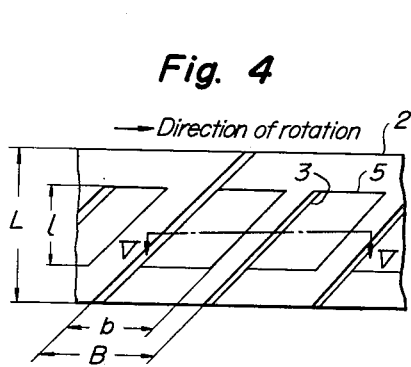
Fig. 4
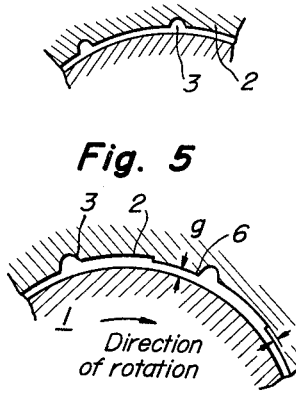
Fig. 5
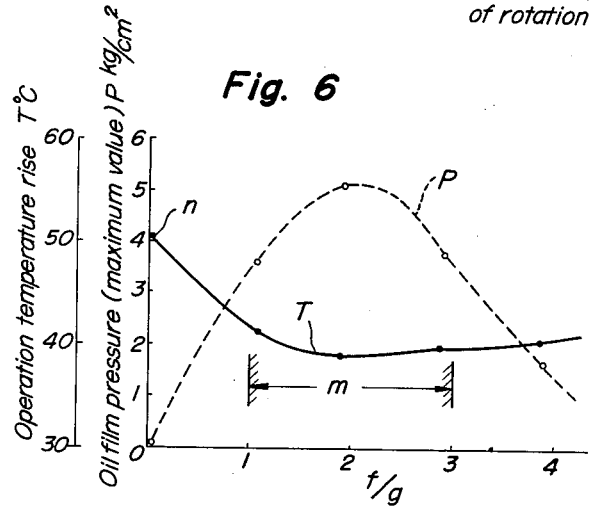
Fig. 6
INVENTORS
KAGEHIKO YAMAMOTO
KINPEI OKANO
BY
ATTORNEY United States Patent Office
3,232,683
Patented Feb. 1, 1966

This invention relates to cylindrical guide bearings for radially supporting a vertically arranged rotative shaft and particularly to the structure of the bearing surface of such guide bearings.

The present invention has for its primary object to provide an improved bearing structure which involves only a limited temperature rise in service.

According to the present invention, there is provided a guide bearing for a vertical shaft which comprises a cylindrical bearing surface, a number of oil grooves formed in said bearing surface in circumferentially spaced apart relation to each other and each inclined upwardly forwardly in the direction of rotation of the shaft, and recesses extending from said respective oil grooves forwardly in the direction of shaft rotation, said recesses each terminating short of the top and bottom edges of said bearing surface and having a depth smaller than that of said oil grooves.

The above and other objects, features and advantages of the present invention will become apparent from the following description when taken in conjunction with the accompanying drawings, in which:

FIG. 1 is a fragmentary axial cross section of a typical conventional guide bearing for a vertical shaft;

FIG. 2 is a fragmentary development of the bearing surface of the conventional guide bearing;

FIG. 3 is a fragmentary cross section taken along the line III—III in FIG. 2;

FIGS. 4 and 5 diagrammatically illustrate the bearing structure according to the present invention, representing a fragmentary development of the bearing surface and a fragmentary cross section taken along the line V—V in FIG. 4, respectively; and FIG. 6 illustrates characteristic curves representing the relationship of the structural proportion of the bearing according to the invention to the temperature rise in operation as well as to the maximum hydrodynamic pressure in the oil film.

Referring first to FIGS. 1 and 2, illustrating a conventional vertical guide bearing, reference numeral 1 designates a rotative shaft vertically supported by the guide bearing 2, which extends at the bottom into an oil reservoir 4. The guide bearing 2 has a number of oil grooves 3 formed in the bearing surface in circumferentially spaced apart relation to each other and each inclined upwardly forwardly in the direction of rotation of the shaft 1. The oil grooves, being arranged at regular intervals, cooperate with the shaft during its rotation to pump up the lubricating oil from the reservoir 4 and distribute the oil over the bearing surface.

On the other hand, with this type of bearing, which serves the purpose of guidingly supporting a vertical shaft, the clearance $g$ between the rotative shaft 1 and the bearing surface is usually uniform along its circumference and the load supported by the bearing is limited. Accordingly, the lubricating oil is simply distributed over the bearing surface and the hydrodynamic pressure in the oil film formed thereon is very limited.

It follows, therefore, that the hydrodynamic pressure in the oil film has substantially no centripetal effect upon the shaft, rendering the bearing system unstable. Unless the shaft is set in an ideal state, the lubricating effect will be heavily impaired to develop a substantial frictional heat in service. This is evident from the fact that the temperature of the bearing region is in fact raised to a substantial extent.

Apparently, any excessively high bearing temperature has various undesirable thermal effects such as rapid deterioration of the lubricating oil and differential extension of the associated parts.

With conventional bearings of this kind, the temperature rise, which is the difference of the bearing temperature from the ambient temperature, has been close to 50° C.

If with any substantial temperature rise, the bearing temperature will become excessively high particularly when the ambient temperature is high. Therefore, the temperature rise should be limited particularly with bearings for use in warm districts.

It has now been found that the temperature rise of this type of bearings can be reduced by increasing the hydrodynamic pressure in the oil film to obtain a centripetal effect on the rotative shaft thereby to reduce the friction between the shaft and the bearing surface.

According to the present invention, it is proposed to form, in the bearing surface of an otherwise conventional bearing, having oil grooves as illustrated in FIG. 2) recesses which extend circumferentially from the respective oil grooves in the direction of rotation of the rotative shaft so that a generally wedge-shaped oil film of substantial length may be formed between each of the oil grooves and the land portion of the bearing surface ahead thereof. It will be understood that the recesses may each have a single relatively shallow flat bottom or a succession of flat bottoms progressively reduced in depth or a single inclined bottom extending between the bottom of the oil groove and the associated bearing land surface. FIG. 4 is a development of a bearing surface constructed according to the principle of the present invention. The bearing surface is similar to that of conventional bearings of the kind concerned in that it includes parallel oil grooves 3 formed therein at regular intervals and each inclined upwardly forwardly in the direction of shaft rotation with the bottom portion immersed in the body of oil held in the reservoir 4.

According to the present invention, a recess 5 is formed in communication with each of the oil grooves 3 which extends from the associated oil grooves forwardly in the direction of rotation and has a depth smaller than that of the oil grooves as illustrated in FIG. 5. Each of the recesses 5 terminates at opposite axial ends short of the edges of the bearing surface or extends intermediate the axial ends thereof having an axial length $l$ smaller than the axial length L of the bearing surface.

This construction is intended to reduce the oil leakage at opposite ends of the bearing. The width or circumferential extent of each of the recesses is properly determined to meet the following requirements taking into account the hydrodynamic pressure in the oil film formed over the bearing surface.

Experiments have shown that best results are obtained when the combined with $b$ of the oil groove and the associated recess is approximately equal to three quarters of the circumferential pitch B of the oil grooves, or when $b = \frac{3}{4}B$. Generally satisfactory results have been obtained in the range of $b$ of from $\frac{1}{2}B$ to $\frac{4}{5}B$. Also, it has been found that the depth $f$ of the recess can be properly determined relative to the clearance $g$ between the shaft and the bearing surface; in other words, the value of $f$ should be determined between $g$ and $3g$.

The oil grooves 3 may all be extended at the top to the upper end of the bearing surface but may alternately be terminated at the same level as the upper end of the associated recess 5 with the remaining oil grooves extended to the top end of the bearing surface as illustrated in FIG. 4.

The bearing structure formed as described above has a transverse cross section as shown in FIG. 5, and the nonuniform clearance between the shaft 1 and bearing 2, which is substantially wedge-shaped in cross section, results in a high hydrodynamic pressure in the oil film formed over the bearing surface. The rotating shaft 1 is thus supported in a stable state under the circumferential distribution of the oil pressure, and the friction between the shaft and the bearing is reduced. As the result, the amount of heat due to such friction and hence the temperature rise of the bearing are minimized.

In FIG. 6, the abscissa represents the ratio ($f/g$) of the clearance $g$ between the shaft and the bearing to the depth $f$ of the recesses while the ordinate represents the temperature rise T or the maximum hydrodynamic pressure P in the oil film when the shaft is rotated at a peripheral speed of 20 meters per second. The range $m$ represents the optimum range of the proportion ($f/g$) as determined by the experiments. The value $n$ corresponds to the temperature rise obtained with conventional bearings of the kind described.

In one practical example of the present invention, a bearing having an inside diameter of 1,050 mm. had a bearing surface formed with ten oil grooves of 4.5 mm. depth arranged circumferentially at regular intervals and recesses extending from the respective oil grooves and each having dimensions of $b=230$ mm. and $f=0.4$ mm. The clearance $g$ was 0.3 mm. and the peripheral speed of the rotative shaft was 20 m./sec. In this example, the value T of the temperature rise was 30° C., which was about 10° C. lower than the value obtained with conventional bearings. Thus, the actual bearing temperature obtained in service under conditions including an ambient temperature about 10° C. higher than usual was substantially the same as that of conventional bearings when put into operation at the usual ambient temperature.

What is claimed is:

1. A guide bearing for supporting a vertical shaft with a predetermined clearance therebetween comprising a cylindrical bearing surface having a central axis, a number of oil grooves formed in said bearing surface and extending to at least one edge of the bearing surface whereby oil may be introduced to the bearing, and said oil grooves being circumferentially spaced apart from each other by a uniform distance B and being each inclined with respect to the central axis of said cylindrical bearing surface, and recesses extending from said respective oil grooves in the direction of inclination of said oil grooves by a distance, of from ½B to ⅘B said recesses each having a depth not less than the predetermined clearance between the shaft and the bearing surface and not more than three times the predetermined clearance when said shaft is mounted within the bearing surface and said recesses terminating short of the top and bottom edges of the bearing surface.

2. A guide bearing for supporting a vertical shaft with a predetermined clearance therebetween comprising a cylindrical bearing surface having a central axis, a number of oil grooves formed in said bearing surface and extendnig to at least one edge of the bearing surface whereby oil may be introduced to the bearing, and said oil grooves being circumferentially spaced apart from each other by a uniform distance and being each inclined with respect to the central axis of said cylindrical bearing surface, and recesses extending from said respective oil grooves in the direction of inclination of said oil grooves, said recesses each having a depth not less than the predetermined clearance between the shaft and the bearing surface and not more than three times the predetermined clearance when the shaft is mounted therein and said recesses terminating short of the top and bottom edges of the bearing surface.

References Cited by the Examiner
UNITED STATES PATENTS

| 1,387,158 | 8/1921 | Leitch | 308—168 |
| 1,780,459 | 11/1930 | Bernhard | 308—168 |
| 2,653,062 | 9/1953 | Sperisen | 308—73 |

FOREIGN PATENTS

| 181,468 | 3/1955 | Austria. |
| 561,148 | 10/1923 | France. |
| 1,031,970 | 3/1953 | France. |

DON A. WAITE, *Primary Examiner.*

FRANK SUSKO, *Examiner.*